US 9,509,965 B2

(12) United States Patent
Nakagomi et al.

(10) Patent No.: US 9,509,965 B2
(45) Date of Patent: Nov. 29, 2016

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Yoichi Nakagomi, Matsumoto (JP); Junichi Suzuki, Matsumoto (JP); Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 264 days.

(21) Appl. No.: 14/506,087

(22) Filed: Oct. 3, 2014

(65) Prior Publication Data

US 2015/0103323 A1    Apr. 16, 2015

(30) Foreign Application Priority Data

Oct. 11, 2013  (JP) ................................ 2013-213472
Mar. 28, 2014  (JP) ................................ 2014-068225

(51) Int. Cl.
*H05B 41/36* (2006.01)
*H04N 9/31* (2006.01)
*H05B 41/288* (2006.01)

(52) U.S. Cl.
CPC ........ *H04N 9/3155* (2013.01); *H05B 41/2887* (2013.01); *H05B 41/2888* (2013.01)

(58) Field of Classification Search
CPC ..... H05B 41/16; H05B 41/28; H05B 41/382
USPC ................ 315/224, 225, 226, 291, 307, 309
See application file for complete search history.

(56) References Cited

U.S. PATENT DOCUMENTS

| 6,867,556 | B2 | 3/2005 | Arimoto et al. |
| 6,979,960 | B2 | 12/2005 | Okawa et al. |
| 7,439,691 | B2 | 10/2008 | Sugaya et al. |
| 7,688,003 | B2 * | 3/2010 | Yamada ............. H05B 41/2886 315/291 |
| 7,946,715 | B2 * | 5/2011 | Yamauchi .......... H05B 41/2928 315/246 |

(Continued)

FOREIGN PATENT DOCUMENTS

| CN | 101336037 A | 12/2008 |
| CN | 103327713 A | 9/2013 |

(Continued)

OTHER PUBLICATIONS

U.S. Appl. No. 14/507,196, filed Oct. 6, 2014 in the name of Nakagomi et al.

(Continued)

*Primary Examiner* — Thuy Vinh Tran
(74) *Attorney, Agent, or Firm* — Oliff PLC

(57) ABSTRACT

A discharge lamp driving device includes: a discharge lamp driving unit which supplies drive power to a discharge lamp; and a control unit which controls the discharge lamp driving unit. The control unit is configured to execute a first driving in which first drive power is supplied to the discharge lamp and a second driving in which second drive power that is equal to or higher than the first drive power and equal to or lower than rated power of the discharge lamp is supplied to the discharge lamp. The control unit executes the second driving in a launching period of the discharge lamp, and adjusts a heat load applied to the discharge lamp in the second driving executed in the launching period, according to a degree of deterioration of the discharge lamp.

19 Claims, 7 Drawing Sheets

(56) References Cited

U.S. PATENT DOCUMENTS

| | | | |
|---|---|---|---|
| 8,018,178 B2 | 9/2011 | Yamauchi | |
| 8,269,426 B2 * | 9/2012 | Yamauchi | H05B 41/2928 315/209 R |
| 8,598,801 B2 * | 12/2013 | Yamashita | H05B 41/2883 315/209 R |
| 2004/0075392 A1 | 4/2004 | Arimoto et al. | |
| 2004/0183473 A1 | 9/2004 | Kamoi et al. | |
| 2007/0262729 A1 | 11/2007 | Sugaya et al. | |
| 2008/0315790 A1 | 12/2008 | Ikeda et al. | |
| 2010/0244741 A1 | 9/2010 | Fukuda et al. | |
| 2013/0250254 A1 | 9/2013 | Saito et al. | |
| 2015/0271901 A1 | 9/2015 | Saito et al. | |

FOREIGN PATENT DOCUMENTS

| | | |
|---|---|---|
| JP | A-H05-082271 | 4/1993 |
| JP | A-H09-017590 | 1/1997 |
| JP | A-2003-223997 | 8/2003 |
| JP | A-2003-295320 | 10/2003 |
| JP | A-2004-134162 | 4/2004 |
| JP | A-2004-342465 | 12/2004 |
| JP | A-2008-41588 | 2/2008 |
| JP | A-2008-270058 | 11/2008 |
| JP | A-2009-076419 | 4/2009 |
| JP | A-4400125 | 1/2010 |
| JP | B2-4400125 | 1/2010 |
| JP | A-2010-113822 | 5/2010 |
| JP | A-4972992 | 7/2012 |
| JP | B2-4972992 | 7/2012 |

OTHER PUBLICATIONS

Aug. 26, 2016 Office Action issued in U.S. Appl. No. 14/507,196.

* cited by examiner

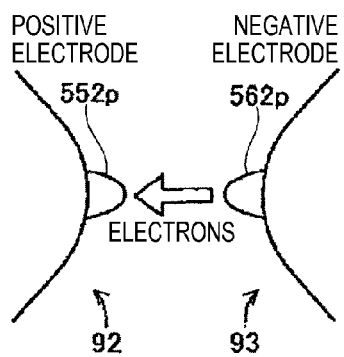
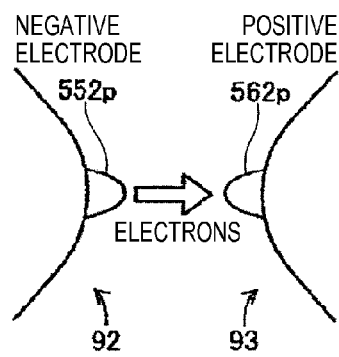
FIG. 6A    FIG. 6B
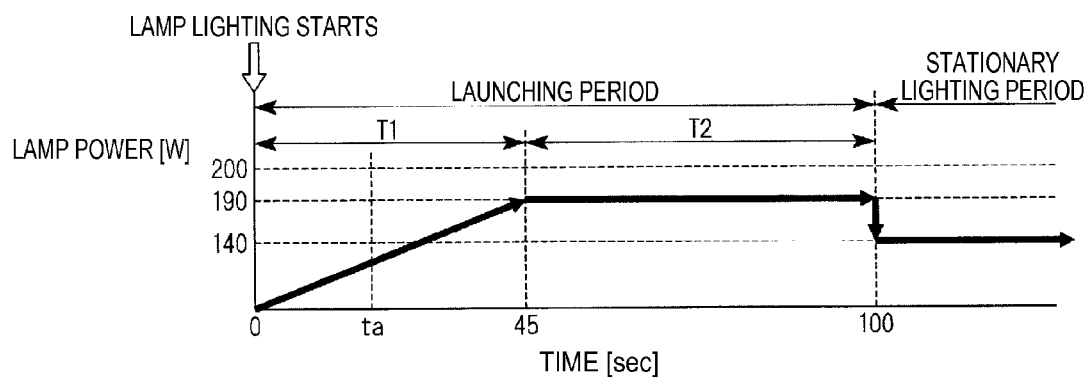
FIG. 7

FIG. 10A
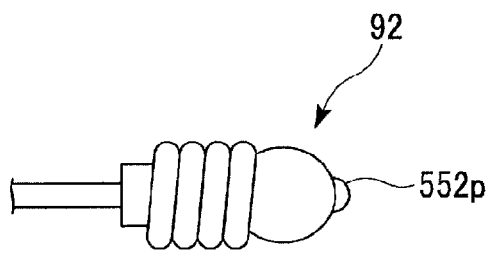
FIG. 10B
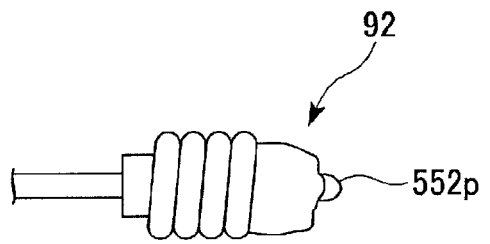
FIG. 10C
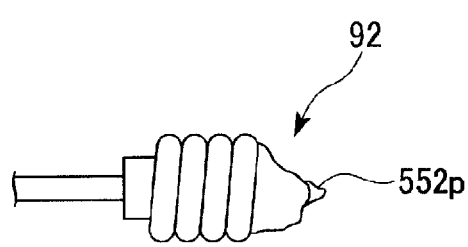
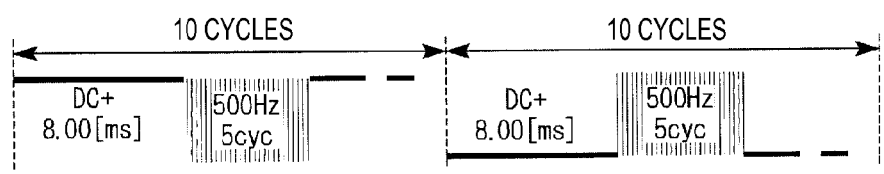
FIG. 11

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source, a projector, and a discharge lamp driving method.

2. Related Art

Recently, energy savings are desired in projectors. Therefore, projectors equipped with various lighting modes are provided, such as a low-power mode in which drive poser to the lamp is lower than usual, a dimming mode in which drive power is changed synchronously with video signals, and a standby mode in which drive power is lowered when video signals are not inputted from outside. For example, in the low-power mode, since lower drive power is supplied to the lamp, the load on the electrodes is lower, thus increasing the service life of the lamp.

However, if drive power is lower than rated power, the protrusions at the distal ends of the electrodes cannot be melted sufficiently. As the lighting is continued for a long time, the protrusions get worn and reduced. The reduction of the protrusions means the expansion of the distance between the electrodes, causing a fall in illuminance. That is, if the shape of the protrusions at the distal ends of the electrodes cannot foe maintained, the advantages of the low-power mode cannot be achieved and a problem of shorter service life of the lamp arises. Thus, in order to overcome this problem, a discharge lamp lighting device and a projector in which the lamp is driven in a refresh lighting mode to promote the melting of the protrusions of the electrodes during a predetermined period after the lighting of the lamp are proposed (see JP-A-2008-270058).

In the projector of JP-A-2008-270058, lamp power above the rated power value is supplied in the refresh lighting mode. In this case, it is anticipated that the protrusions formed in normal lighting are melted excessively and cannot be maintained in shape. Consequently, the lamp flickers as the lamp cannot maintain stable discharge. Also, a high load is on the arc tube and may cause inconvenience such as crystallization of the quartz glass or so-called, devitrification.

SUMMARY

An advantage of some aspects of the invention is that a discharge lamp driving device, a light source, a projector and a discharge lamp driving method that can maintain stable discharge are provided.

An aspect of the invention is directed to a discharge lamp driving device including: a discharge lamp driving unit which supplies drive power to a discharge lamp; and a control unit which controls the discharge lamp driving unit. The control unit is configured to execute a first driving in which first drive power is supplied to the discharge lamp and a second driving in which second drive power that is equal to or higher than the first drive power and equal to or lower than rated power of the discharge lamp is supplied to the discharge lamp. The control unit executes the second driving in a launching period of the discharge lamp, and adjusts a heat load applied to the discharge lamp in the second driving executed in the launching period, according to a degree of deterioration of the discharge lamp.

The discharge lamp driving device according to this aspect of the invention has the first driving in which the discharge lamp is driven with relatively low first drive power. According to the related art, in the first driving, it is difficult to sufficiently melt the protrusions at the distal ends of the electrodes of the discharge lamp, and as the lighting is continued, the protrusions maybe reduced; causing a fail in illuminance of the discharge lamp. In contrast, in the discharge lamp driving device according to this aspect of the invention, the second driving is executed in which the discharge lamp is driven with the second drive power that is set to a value equal to or above the relatively low first drive power and equal to or below the rated power in the launching period. Therefore, the protrusions at the distal ends of the electrodes can be melted properly and the shape of the protrusions can be maintained.

In the discharge lamp driving device according to this aspect of the invention, the heat load applied to the discharge lamp in the second driving is adjusted according to the degree of deterioration of the discharge lamp. Therefore, even if the degree of deterioration of the discharge lamp changes, the melting state of the protrusions at the distal ends of the electrodes can be stably controlled according to the degree of deterioration. Consequently, stable discharge is achieved. Therefore, change in illuminance of the discharge lamp can he restrained and a long service life of the discharge lamp can be maintained.

The discharge lamp driving device according to the aspect of the invention may foe configured such that the control unit sets the heat load to be higher with progress of the deterioration of the discharge lamp.

According to this configuration, a relatively low heat load is set for the discharge lamp where deterioration has not progressed so much, whereas a relatively high heat load is set for the discharge lamp where deterioration has progressed. Thus, excessive malting of the protrusions at the distal ends of the electrodes of the discharge lamp can be restrained and the shape of the protrusions can be maintained.

The discharge lamp driving device according to the aspect of the invention may he configured such that in case that the degree of-deterioration of the discharge lamp is higher than a predetermined value, the control unit sets the heat load to be equal to or lower than the heat load corresponding to the predetermined value.

According to this configuration, application of a high heat load to the discharge lamp where deterioration has progressed to a certain degree is restrained. Therefore, disappearance of the protrusions at the distal ends of the electrodes can be restrained.

The discharge lamp driving device according to the aspect of the invention may be configured such that in case that the degree of deterioration of the discharge lamp is equal to or lower than the predetermined value, the control unit sets the heat load to foe higher with progress of the deterioration of the discharge lamp.

According to this configuration, with respect to the discharge lamp where the degree of deterioration is equal to or below the predetermined value, a higher heat load is set with progress of the deterioration of the discharge lamp. Therefore, the protrusions at the distal ends of the electrodes can be melted properly.

The discharge lamp driving device according to the aspect of the invention may be configured such that in case that the degree of deterioration of the discharge lamp is higher than the predetermined value, the control unit sets the heat load to be lower with progress of the deterioration of the discharge lamp.

According to this configuration, with respect to the discharge lamp where deterioration has progressed to a certain extent, a lower heat load is set with progress of the deterioration of the discharge lamp. Therefore, disappearance of the protrusions at the distal ends of the electrodes can be restrained further.

The discharge lamp driving device according to the aspect of the invention may be configured such that the adjusting of the heat load includes adjusting a value of the second drive power.

According to this configuration, the melting of the protrusions at the distal ends of the electrodes can he restrained by adjusting the second drive power.

The discharge lamp driving device according to the aspect of the invention may be configured such that the adjusting of the heat load includes adjusting a waveform of a drive current supplied to the discharge lamp in the launching period.

According to this configuration, the melting of the protrusions at the distal ends of the electrodes can be restrained by adjusting the waveform of the drive current.

The discharge lamp driving device according to the aspect of the invention may be configured such that the control unit detects the degree of deterioration of the discharge lamp by referring to an inter-electrode voltage of the discharge lamp in the first driving.

As the protrusions at the distal ends of the electrodes of the discharge lamp are worn and reduced, the distance between the electrodes expands and the inter-electrode voltage increases accordingly. Therefore, according to this configuration, the degree of deterioration of the discharge lamp can be directly grasped by referring to the inter-electrode voltage of the discharge lamp, and optimum second drive power can be set.

The discharge lamp driving device according to the aspect of the invention may be configured such that the launching period includes a first launching period in which the drive power is increased toward the second drive power, and the control unit refers to the inter-electrode voltage at an arbitrary time point in the first launching period and estimates the inter-electrode voltage in the first driving on the basis of a result of the reference to the inter-electrode voltage.

According to this configuration, the inter-electrode voltage in the first launching period is referred to, every time the lamp is lit. Therefore, the inter-electrode voltage in the first driving can be estimated accurately and the degree of deterioration of the discharge lamp can be detected appropriately.

The discharge lamp driving device according to the aspect of the invention may be configured such that the control unit reads out the inter-electrode voltage stored at the time of previous lighting of the discharge lamp, at the time of next lighting of the discharge lamp, and estimates the inter-electrode voltage in the first driving on the basis of a result of the reading of the inter-electrode voltage.

According to this configuration, the inter-electrode voltage that is already stored at the time of previous lighting is referred to at the time of next lighting. Therefore, the inter-electrode voltage in the first driving can be easily estimated and the degree of deterioration of the discharge lamp can be detected appropriately.

Another aspect of the invention is directed to a light source including: a discharge lamp which emits light; and the discharge lamp driving device described above.

According to this aspect, a light source that can achieve stable illuminance and a long service life of the discharge lamp can be realized.

Still another aspect of the invention is directed to a projector including: the light source described above; a light modulation element which modulates light emitted from the light source, according to a video signal; and a projection system which projects the light modulated by the light modulation element.

According to this aspect, a projector with excellent display definition and high reliability can be realized.

Yet another aspect of the invention is directed to a discharge lamp driving method in which drive power is supplied to a discharge lamp to drive the discharge lamp, including: providing a first driving in which first drive power is supplied to the discharge lamp; providing a second driving in which second drive power is supplied to the discharge lamp, the second drive power being equal to or higher than the first drive power and equal to or lower than rated power of the discharge lamp; executing the second driving in a launching period of the discharge lamp; and adjusting a heat load applied to the discharge lamp in the second driving executed in the launching period according to a degree of deterioration of the discharge lamp.

According to the discharge lamp driving method, stable discharge is achieved. Therefore, change in illuminance of the discharge lamp can be restrained and a long service life of the discharge lamp can be maintained.

BRIEF DESCRIPTION OF THE DRAWINGS

The invention will be described with reference to the accompanying drawings, wherein like numbers reference like elements.

FIGS. 6A and 6B show the state of protrusions at the distal ends of the electrodes of the discharge lamp.

FIG. 7 shows an example of a drive power waveform of the discharge lamp of the first embodiment.

FIGS. 10A to 10C show change in protrusions at the distal ends of the electrodes of the discharge lamp as deterioration progresses.

FIG. 11 shows a drive current waveform of the second embodiment.

DESCRIPTION OF EXEMPLARY EMBODIMENTS

Figure 1:
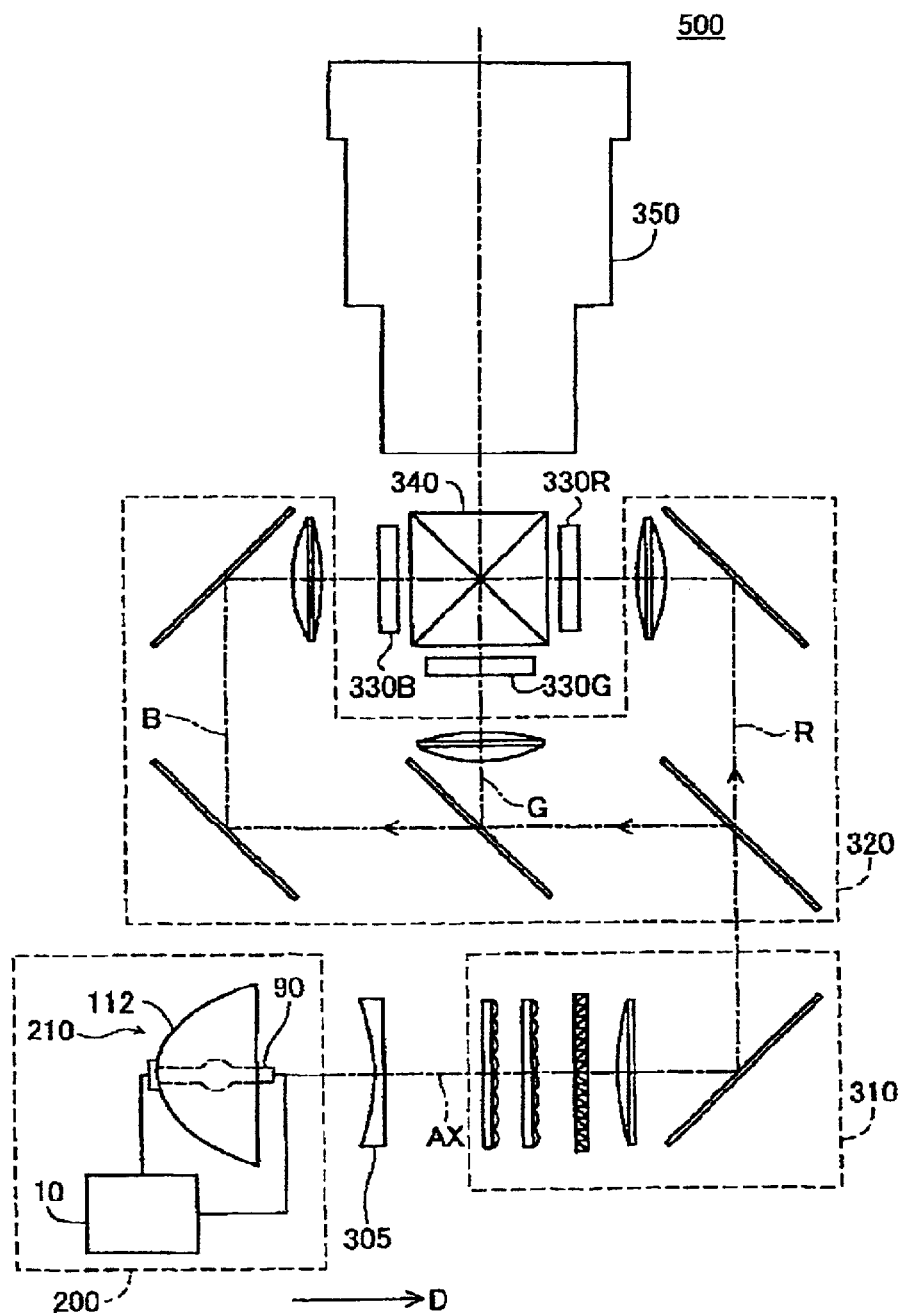
FIG. 1 shows the schematic configuration of a projector according to a first embodiment.

Hereinafter, a projector according to embodiments of the invention will be described with reference to the drawings. It should be noted that the scope of the invention is not limited to the embodiments below and that arbitrary changes can be made within the technical ideas of the invention. Also, in the drawings, the scale, number and the like of each structure may appear different from the actual structure, in order to facilitate understanding of each configuration.

First Embodiment

As shown in FIG. 1, a projector 500 according to this embodiment includes a light source 200, a parallelizing lens 305, an illumination system 310, a color separation system 320, three liquid crystal light valves 330R, 1100, 330B (light modulation elements), a cross dichroic prism 340, and a projection system 350.

The light emitted from the light source 200 passes through the parallelizing lens 305 and becomes incident on the illumination system 310. The parallelizing lens 305 has the function of parallelizing the light from the light source 200.

The illumination system 310 has the function of adjusting the illuminance of the light emitted from the light source 200 so that the illuminance becomes uniform on the liquid crystal light valves 330R, 330G, 330B. The illumination system 310 also has the function of aligning the polarizing direction of the light emitted from the light source 200 into one direction. The reason for this is to allow the light emitted from the light source 200 to be effectively utilized on the liquid crystal light valves 330R, 330G, 330B.

The light with the illuminance distribution and polarizing direction thus adjusted becomes incident on the color separation system 320. The color separation system 320 separates the incident light into three color lights of red light (R), green light (G), and blue light (B). The three color lights are modulated by the liquid crystal light valves 330R, 330G, 330B corresponding to the respective color lights. The liquid crystal light valves 330R, 330G, 330B have liquid crystal panels 560R, 560G, 560B, described later, and polarizers (not shown). The polarizers are arranged on the light incident side and light exiting side of each of the liquid crystal panels 560R, 560G, 560B.

The modulated three color lights are combined by the cross dichroic prism 340. The combined light becomes incident on the projection system 350. The projection system 350 projects the incident light onto a screen 700 (see FIG. 3). Thus, a video is displayed on the screen 700. Known configurations can foe employed for each of the parallelizing lens 305, the illumination system 310, the color separation system 320, the cross dichroic prism 340 and the projection system 350.

Figure 2:
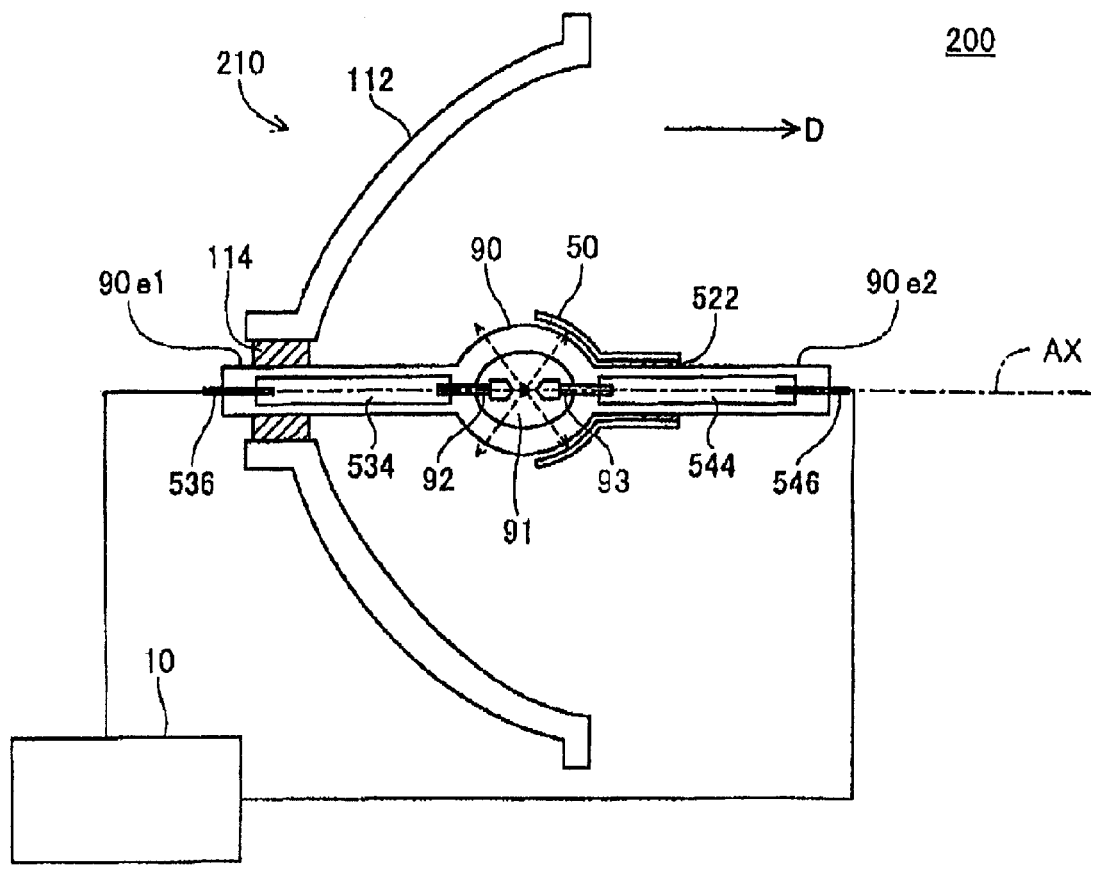
FIG. 2 is a cross-sectional view showing a discharge lamp of the first embodiment.

FIG. 2 is a cross-sectional view showing the configuration of the light source 200. The light source 200 includes a light source unit 210, and a discharge lamp lighting device (discharge lamp driving device) 10. FIG. 2 shows a cross-sectional view of the light source unit 210. The light source unit 210 has a main reflection mirror 112, a discharge lamp 90, and a sub reflection mirror 50.

The discharge lamp lighting device 10 supplies drive power (drive current) to the discharge lamp 90 and thus lights the discharge lamp 90. The main reflection mirror 112 reflects the light radiated from the discharge lamp 90 into an irradiating direction D. The irradiating direction D is parallel to an optical axis AX of the discharge lamp 90.

The shape of the discharge lamp 90 is a bar-shape extending along the irradiating direction D. One end of the discharge lamp 90 is defined as a first end 90e1. The other end of the discharge lamp 90 is defined as a second end 90e2. The material of the discharge lamp 90 is, for example, a light-transmissive material such as quarts glass. A center part of the discharge lamp 90 is expanded in a spherical shape and the inside thereof is a discharge space 91. In the discharge space 91, a gas that is a discharge medium containing a rare gas, metal halogen compound or the like is enclosed.

In the discharge space 91, distal ends of a first electrode 92 and a second electrode 93 are protruding. The first electrode 92 is arranged on the side of the first end 90e1 of the discharge space 91. The second electrode 93 is arranged on the side of the second end 90e2 in the discharge space 91. The shape of the first electrode 92 and the second electrode 93 is a bar-shape extending along the optical axis AX. In the discharge space 91, the electrode distal ends of the first electrode 92 and the second electrode 93 are arranged facing each other at a predetermined distance from each other. The material of the first electrode 92 and the second electrode 93 is, for example, a metal such as tungsten.

A first terminal 536 is provided at the first end 90e1 of the discharge lamp 90. The first terminal 536 and the first electrode 92 are electrically connected to each other by a conductive member 534 penetrating the inside of the discharge lamp 90. Similarly, a second terminal 546 is provided at the second end 90e2 of the discharge lamp 90. The second terminal 546 and the second electrode 93 are electrically connected to each other by a conductive member 544 penetrating the inside of the discharge lamp 90. The material of the first terminal 536 and the second terminal 546 is, for example, a metal such as tungsten. As the material of the conductive members 534, 544, for example, a molybdenum foils is used.

The first terminal 536 and the second terminal 546 are connected to the discharge lamp lighting device 10. The discharge lamp lighting device 10 supplies drive power for driving the discharge lamp 90, to the first terminal 536 and the second terminal 546. Consequently, arc discharge occurs between the first electrode 92 and the second electrode 93. The light (discharge light) generated by the arc discharge is radiated in all directions from the discharge position, as indicated by dashed line arrows.

The main reflection mirror 112 is fixed to the first end 90e1 of the discharge lamp 00 by a fixing member 114. The main reflection mirror 112 reflects the light that travels opposite to the irradiating direction D, of the discharge light, into the irradiating direction D. The shape of the reflection surface (surface on the side of the discharge lamp 90) of the main reflection mirror 112 is not particularly limited as long as it is within a range in which the mirror can reflect the discharge light into the irradiating direction D. The shape of the reflection surface may be, for example, a rotating elliptic shape or a rotating parabolic shape. For example, if the shape of the reflection surface of the main reflection mirror 112 is a rotating parabolic shape, the main reflection mirror 112 can convert the discharge light into light that is substantially parallel to the optical axis AX. This enables omission of the parallelizing lens 305.

The sub reflection mirror 50 is fixed to the discharge lamp 90 on the side of the second end 90e2 by a fixing member 522. The shape of the reflection surface (surface on the side of the discharge lamp 90) of the sub reflection mirror 50 is a spherical shape surrounding the portion on the side of the second end 90e2, of the discharge space 91. The sub reflection mirror 50 reflects the light that travels opposite to the side where the main reflection mirror 112 is arranged, of the discharge light, toward the main reflection mirror 112. Thus, the utilization efficiency of the light radiated from the discharge space 91 can be enhanced.

The material of the fixing members 114, 522 is not particularly limited as long as it is within a range of heat-resistant material that can resist heat generation from the discharge lamp 90. For example, an inorganic adhesive may be used, The method for fixing the arrangement of the main reflection mirror 112 and the sub reflection mirror 50 in relation to the discharge lamp 90 is not limited to the method in which the main reflection mirror 112 and the sub reflection mirror 50 are fixed to the discharge lamp 90, and an arbitrary method can be employed. For example, the discharge lamp 90 and the main reflection mirror 112 may be separately fixed to a casing (not shown) of the projector 500. The same can be applied to the sub reflection mirror 50.

Hereinafter, the circuit configuration of the projector 500 will foe described.

Figure 3:
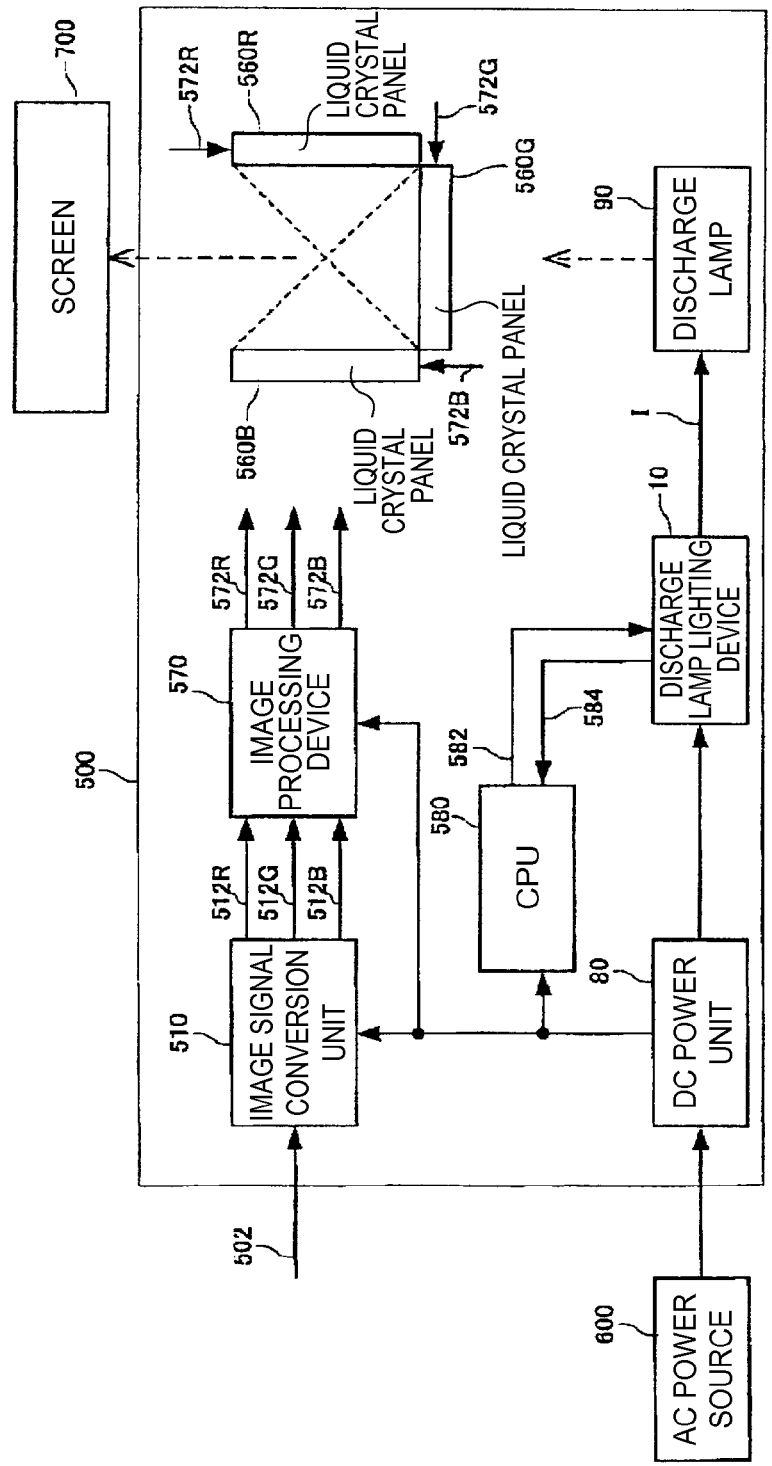
FIG. 3 is a block diagram showing various components of the projector of the first embodiment.

FIG. 3 shows an example of the circuit configuration of the projector 500 of this embodiment. The projector 500 includes an image signal conversion unit 510, a DC power unit 80, the liquid crystal panels 560R, 560G, 560B, an image processing device 570, and a CPU (central processing unit) 580, in addition to the optical system shown in FIG. 1.

The image signal conversion unit 510 converts an image signal 502 inputted from outside (such as luminance and color difference signals or analog RGB signals) to a digital RGB signal with a predetermined word length, thus generates image signals 512R, 512G, 512B and supplies the image signals to the image processing device 570.

The image processing device 570 carries out image processing on each of the three image signals 512R, 512G, 512B. The image processing device 570 supplies drive signals 572R, 572G, 572B for driving the liquid crystal panels 560R, 560G, 560B, respectively, to the liquid crystal panels 560R, 560G, 560B.

The DC power unit 80 converts an AC voltage supplied from an external AC power source 600 into a predetermined DC voltage. The DC power unit 80 supplies the DC voltage to the image signal conversion unit 510 and the image processing device 570 on the secondary side of a transformer (not shown but included in the DC power unit 80) and to the discharge lamp lighting device 10 on the primary side of the transformer.

The discharge lamp lighting device 10, on startup, generates a high inter-electrode voltage of the discharge lamp 90 and thus causes insulation breakdown to form a discharge path. Subsequently, the discharge lamp lighting device 10 supplies a drive current I for the discharge lamp 90 to maintain discharge.

The liquid crystal panels 560R, 560G, 560B are provided in the liquid crystal light valves 330R, 330G, 330B, respectively. The liquid crystal panels 560R, 560G, 560B modulate the transmittance (luminance) of the color lights incident on the respective liquid crystal panels 560R, 560G, 560B via the foregoing optical system, based on the respective drive signals 572R, 572G, 572B.

The CPU 580 controls various operations from the start of lighting of the projector 500 to turning off of the lighting. For example, in the example of FIG. 3, the CPU 580 outputs a lighting command or turning-off command to the discharge lamp lighting device 10 via a communication signal 582. The CPU 580 receives lighting information of the discharge lamp 90 from the discharge lamp lighting device 10 via a communication signal 584.

Hereinafter, the configuration of the discharge lamp lighting device 10 will be described.

Figure 4:
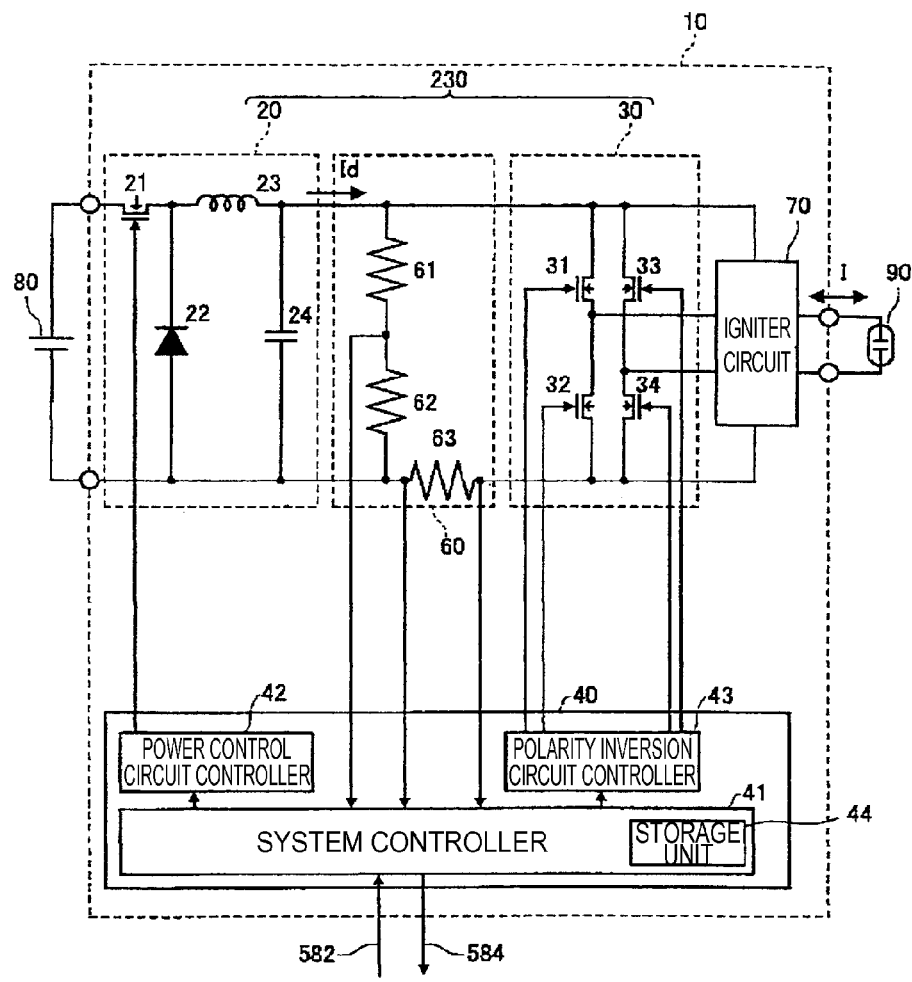
FIG. 4 is a circuit diagram showing a discharge lamp lighting device of the first embodiment.

FIG. 4 shows an example of the circuit configuration of the discharge lamp lighting device 10.

As shown in FIG. 4, the discharge lamp lighting device 10 has a power control circuit 20, a polarity inversion circuit 30, a control unit 40, an operation detection unit 60, and an igniter circuit 70.

The power control circuit 20 generates drive power to foe supplied to the discharge lamp 90. In this embodiment, the power control circuit 20 is made up of a step-down chopper circuit which takes the voltage from the DC power unit 80 as an input, lowers the input voltage and outputs a DC current Id.

The power control circuit 20 includes a switch element 21, a diode 22, a coil 23, and a capacitor 24. The switch element 21 is made up of, for example, a transistor. In this embodiment, one end of the switch element 21 is connected to the positive voltage side of the DC power unit 80, and the other end is connected to the cathode terminal of the diode 22 and one end of the coil 23.

One end of the capacitor 24 is connected to the other end of the coil 23, and the other end of the capacitor 24 is connected to the anode terminal of the diode 22 and the negative voltage side of the DC power unit 80. A current control signal from the control unit 40, later described, is inputted to the control terminal of the switch element 21 and the switch element 21 is thus on/off-controlled. As the current control signal, for example, a PWM (pulse width modulation) control signal may be used.

As the switch element 21 is switched on, a current flows through the coil 23 and energy is accumulated in the coil 23. As the switch element 21 is subsequently switched off, the energy accumulated in the coil 23 is discharged through a route passing through the capacitor 24 and the diode 22. Consequently, a DC current Id corresponding to the proportion of the time when the switch element 21 is on is generated.

The polarity inversion circuit 30 inverts the polarity of the DC current Id inputted from the power control circuit 20, at predetermined timing. Thus, the polarity inversion circuit 30 generates and outputs a drive current I that is a direct current continuing for a controlled time, or a drive current I that is an alternating current with an arbitrary frequency. In this embodiment, the polarity inversion circuit 30 is made up of an inverter bridge circuit (full bridge circuit).

The polarity inversion circuit 30 includes a first switch, element 31, a second, switch element 32, a third switch element 33, and a fourth switch element 34 which are made up of, for example, transistors or the like. The polarity inversion circuit 30 is configured in such a way that the first switch element 31 and the second switch element 32, connected in series, and the third switch element 33 and the fourth switch element 34, connected in series, are connected in parallel. A polarity inversion control signal is inputted to each of the control terminals of the first switch element 31, the second switch element 32, the third switch element 33 and the fourth switch element 34 from the control unit 40. Based on the polarity inversion control signal, the on/off operation of the first switch element 31, the second switch element 32, the third switch element 33 and the fourth switch element 34 is controlled.

In the polarity inversion circuit 30, an operation to alternately switch on and off the first switch element 31 and the fourth switch element 34 on one hand and the second switch element 32 and the third switch element 33 on the other is repeated. Thus, the polarity of the DC current Id output ted from the power control circuit 20 is alternately inverted. The polarity inversion circuit 30 generates and outputs a drive current I that is a direct current maintaining the same polarity state for a controlled time, or a drive current I that is an alternating current with a controlled frequency, from the common connection point between the first switch element 31 and the second switch element 32 and the common connection point between the third switch element 33 and the fourth switch element 34.

That is, the polarity inversion circuit 30 is controlled in such a way that when the first switch element 31 and the fourth switch element 34 are on, the second switch element 32 and the third switch element 33 are off, whereas when the first switch element 31 and the fourth switch element 34 are off, the second switch element 32 and the third switch element 33 are on. Therefore, when the first switch element 31 and the fourth switch element 34 are on, a drive current I flowing from one end of the capacitor 24 in the order of the first switch element 31, the discharge lamp 90 and the fourth switch element 34 is generated. When the second switch element 32 and the third switch element 33 are on, a drive current I flowing from one end of the capacitor 24 in the order of the third switch element 33, the discharge lamp 90 and the second switch element 32 is generated.

In this embodiment, a section made up of the power control circuit 20 and the polarity inversion circuit 30 is equivalent to a discharge lamp driving unit 230. That is, the discharge lamp driving unit 230 supplies the drive current I (drive power) for driving the discharge lamp 90, to the discharge lamp 90.

The control unit 40 controls the discharge lamp driving unit 230. In the example of FIG. 4, the control unit 40 controls the power control circuit 20 and the polarity inversion circuit 30 and thereby controls parameters such as the duration for which the drive current I maintains the same polarity, the current value of the drive current I (power value of drive power), and the frequency thereof. The control unit 40 performs polarity inversion control on the polarity inversion circuit 30 so as to control the duration for which the drive current I maintains the same polarity, the frequency of the drive current I or the like, using the polarity inversion timing of the drive current I. The control unit 40 performs current control on the power control circuit 20 so as to control the current value of the DC current Id to be outputted.

In this embodiment, the control unit 40 is capable of executing a drive (first driving) in which low-power mode power (first drive power), described later, is supplied to the discharge lamp 90, and a drive (second driving) in which refresh power (second drive power), described later, is supplied to the discharge lamp 90.

The configuration of the control unit 40 is not particularly limited. In this embodiment, the control unit 40 includes a system controller 41, a power control circuit controller 42, and a polarity inversion circuit controller 43. The control unit 40 may be partly or entirely made up of a semiconductor integrated circuit.

The system controller 41 controls the power control circuit controller 42 and the polarity inversion circuit controller 43 and thereby controls the power control circuit 20 and the polarity inversion circuit 30. The system controller 41 may control the power control circuit controller 42 and the polarity inversion circuit controller 43, based on a lamp voltage (inter-electrode voltage) Vla detected by the operation detection unit 60 and the drive current I.

In this embodiment, the system controller 41 may include a storage unit 44. The storage unit 44 may be provided separately from the system controller 41.

The system controller 41 may control the power control circuit 20 and the polarity inversion circuit 30, based on information stored in the storage unit 44. In the storage unit 44, for example, information about drive parameters may be stored, such as the duration for which the drive current I maintains the same polarity, and the current value, frequency, waveform, modulation pattern or the like of the drive current I.

The power control circuit controller 42 outputs a current control signal to the power control circuit 20, based on a control signal from the system controller 41, and thereby controls the power control circuit 20.

The polarity inversion circuit controller 43 outputs a polarity inversion control signal to the polarity inversion circuit 30, based on a control signal from the system controller 41, and thereby controls the polarity inversion circuit 30.

The control unit 40 can be realized by using a dedicated circuit and can be configured to perform the above controls and various controls of processing, described later. Meanwhile, the control unit 40 can also foe configured to function as a computer and perform the various controls of processing, for example, by causing the CPU to execute a control program stored in the storage unit 44.

Figure 5:
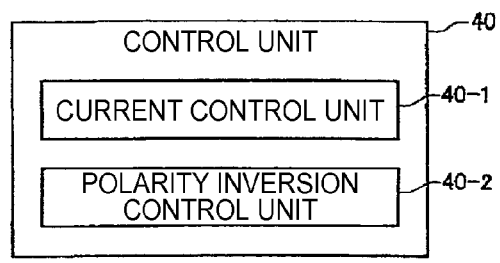
FIG. 5 is a block diagram showing an example of configuration of a control unit of the first embodiment.

FIG. 5 illustrates another example of the configuration of the control unit 40. As shown in FIG. 5, the control unit 40 may be configured to function as a current control unit 40-1 which controls the power control circuit 20 and as a polarity inversion control unit 40-2 which controls the polarity inversion circuit 30, based on a control program.

In the example shown in FIG, 4, the control unit 40 is configured as a part of the discharge lamp lighting device 10. Meanwhile, the CPU 580 may be configured to take charge of a part of the functions of the control unit 40.

The operation detection unit 60 may include, for example, a voltage detection unit which detects the lamp voltage of the discharge lamp 90 and outputs lamp voltage information to the control unit 40, a current detection unit which detects the drive current I and outputs drive current information to the control unit 40, and the like. In this embodiment, the operation detection unit 60 includes a first resistor 61, a second resistor 62, and a third resistor 63. The lamp voltage of the discharge lamp 90 means the inter-electrode voltage of the discharge lamp 90.

In this embodiment, the voltage detection unit detects the lamp voltage Vla based on the voltage divided by the first resistor 61 and the second resistor 62, which are connected in parallel with the discharge lamp 90 and connected in series with each other. In this embodiment, the current detection unit detects the drive current I based on the voltage generated at the third resistor 63 connected in series with the discharge lamp 90.

The igniter circuit 70 operates only when the lighting of the discharge lamp 90 starts. The igniter circuit 70 supplies a high voltage (higher voltage than in normal lighting of the discharge lamp 90) that is necessary for breaking insulation between the electrodes (between the first electrode 92 and the second electrode 93) of the discharge lamp 90 and thus forming a discharge path, between the electrodes (between the first electrode 92 and the second electrode 93) of the discharge lamp 90 when starting the lighting of the discharge lamp 90. In this embodiment, the igniter circuit 70 is connected in parallel with the discharge lamp 90.

FIGS. 6A and 6B show the distal ends of the first electrode 92 and the second electrode 93. Protrusions 552p, 562p are formed at the distal ends of the first electrode 92 and the second electrode 93, respectively. Discharge occurring between the first electrode 92 and the second electrode 93 is mainly generated between the protrusion 552p and the protrusion 562p. In the case where there are protrusions 552p, 562p as in this embodiment, a shift of the discharge position (arc position) on the first electrode 92 and the second electrode 93 can be restrained, compared with the case with no protrusions.

FIG. 6A shows a first polarity state where the first electrode 92 operates as the positive electrode and the second electrode 93 operates as the negative electrode. In the first polarity state, discharge causes electrons to move from the second electrode 93 (negative electrode) to the first electrode 92 (positive electrode). Electrons are discharged from, the negative electrode (second electrode 93). The electrons discharged from the negative electrode (second electrode 93) collide with the distal end of the positive electrode (first electrode 92). This collision generates heat, raising temperature at the distal end (protrusion 552p) of the positive electrode (first electrode 92).

FIG. 6B shows a second polarity state where the first electrode 92 operates as the negative electrode and the second electrode 93 operates as the positive electrode. In the second polarity state, contrary to the first polarity state, electrons move from the first electrode 92 to the second electrode 93. Consequently, temperature increases at the distal end (protrusion 562p) of the second electrode 93.

In this way, the temperature of the positive electrode, with which electrons collide, tends to be higher than the temperature of the negative electrode, which discharges electrons. Here, as the temperature of one electrode remains higher than the temperature of the other electrode for a long time, if may cause various inconveniences. For example, if the distal end of the high-temperature electrode is melted excessively, unintended deformation of the electrode can occur. Consequently, the distance between the electrodes (arc length) may become deviated from a proper value, causing unstable illuminance. Meanwhile, if the distal end of the low-temperature electrode is melted insufficiently, micro irregularities generated at the distal end may remain without melting. Consequently, a so-called arc jump may occur (the arc position may become unstable and move).

In this embodiment, in order to melt the protrusions at the distal ends of the electrode properly, the heat load applied to the discharge lamp 90 is adjusted. In this embodiment, a case using a method in which the drive power supplied to the discharge lamp 90 is adjusted, as a method for adjusting the heat load, will be described. That is, the drive power is set to be large when the heat load is to be increased, and the drive power is set to be small when the heat load is to be decreased. The heat load applied to the discharge lamp 90 is thus adjusted.

In this embodiment, the drive power (heat load) supplied to the discharge lamp 90 is controlled as shown in FIG. 7.

FIG. 7 shows the waveform of the drive power in this embodiment. The horizontal axis in FIG. 7 represents time (seconds). The vertical axis in FIG. 7 represents drive power (W).

As the lighting of the discharge lamp 90 is started, drive power gradually increases and then reaches predetermined target power. At this point, the plasma density inside the discharge lamp 90 is small and the temperature is low. The drive power is unstable. After that, as the plasma density and temperature inside the discharge lamp 90 increase, the drive power becomes stable. The period until the drive power is stabilized from the start of the lighting of the discharge lamp 90 is defined as a launching period. During a period following the launching period, the discharge lamp 90 is lit continuously. This period is defined as a stationary lighting period.

In the drive power waveform of this embodiment, the launching period has a first launching period T1 in which the drive power gradually increases toward the refresh power (second drive power) and a second launching period T2 in which the drive power is kept constant at the value of the refresh power, as shown in FIG. 7. The durations of the first launching period T1 and the second launching period T2 can be set suitably. The drive power waveform also has the stationary lighting period (low-power mode lighting period) in which the low-power mode power (first drive power), which is relatively low power, is supplied, after the launching period ends. In this embodiment, the driving of the discharge lamp 90 with the low-power mode power as the first drive power is defined as the first driving, and the driving of the discharge lamp 90 with the refresh power as the second drive power is defined as the second driving.

Specifically, as an example, rated power Wt of the discharge lamp 90 is 200 W, low-power mode power (first drive power) Wl is 140 W, and refresh power (second drive power) Wr is 190 W. These voltage values satisfy the relation of Wl≤Wr≤Wt. For example, in the first launching period T1 from 0 seconds to 45 seconds, the drive power linearly increases from 0 V to 190 W. In the second launching period 12 from 45 seconds to 100 seconds, the drive power is kept constant at 190 W. In the stationary lighting period after 100 seconds, the drive power is kept constant at 140 W.

In FIG. 7, the refresh power Wr is shown as 190 W. However, the control unit 40 shown in FIG. 4 calculates the degree of deterioration of the discharge lamp 90 with reference to the lamp voltage (inter-electrode voltage) and properly adjusts the value of the refresh power according to the degree of deterioration of the discharge lamp 90. That is, as the deterioration (wear) of the discharge lamp 90 progresses, the lamp voltage increases with an increase in the distance between the electrodes. In this ease, the refresh power needs to be raised to melt the protrusions at the distal ends of the electrodes further. Particularly when the discharge lamp 90 is driven in the low-power mode, only the distal ends of the electrodes are melted and form micro protrusions. In the low-power mode, the electrodes do not easily melt. Therefore, the protrusions can be easily deformed, causing the projection screen to flicker. However, by properly forming micro protrusions, arc discharge is stabilized by the protrusions and the flickering can be restrained.

If the refresh power is raised in a new discharge lamp 90 that is not deteriorated, the distal ends of the electrodes melt excessively and micro protrusions disappear. In a discharge lamp 90 which is deteriorated, since the current value is lowered, the electrodes can be properly melted while the degree of deterioration is maintained. Therefore, the refresh power is set to be relatively low for the discharge lamp 90 which is not deteriorated, and relatively high for the discharge lamp 90 which is deteriorated. By thus finding the correlation between a lamp voltage and optimum refresh power corresponding to the lamp voltage in advance, the designer of the projector can restrain the flickering of the projection screen. An example of the correlation between the lamp voltage and the refresh power is shown in Table 1.

TABLE 1

| Lamp Voltage That Is Referred To | Refresh Power |
| --- | --- |
| 0 to 60 V | 140 W |
| 61 to 70 V | 170 W |
| 71 to 80 V | 180 W |

TABLE 1-continued

| Lamp Voltage That Is Referred To | Refresh Power |
| --- | --- |
| 81 to 90 V | 190 W |
| 91 V and above | 200 W |

Figure 8:
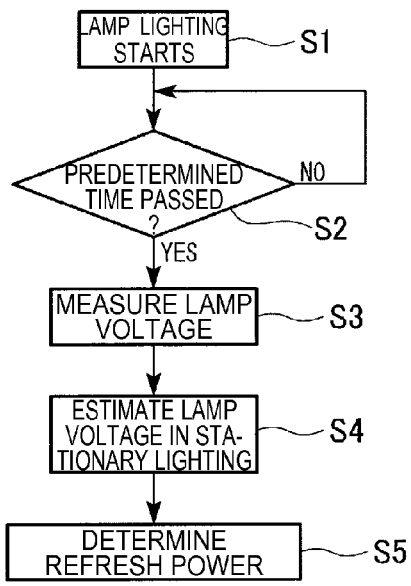
FIG. 8 is a flowchart for determining the drive power waveform in the first embodiment.

Here, a first procedure from referring the lamp voltage (inter-electrode voltage) to determining the refresh power will be described with reference to FIG. 8.

After the discharge lamp 90 is lit (Step S1), a time to refer to the lamp voltage in the first launching period T1 (equivalent to ta in FIG. 7) is set in advance. The time ta is set, for example, to 20 seconds. The control unit 40 determines whether the time ta (20 seconds) has passed from the start of the lighting of the discharge lamp 90 or not (Step S2).

If the time ta (20 seconds) has passed, the control unit 40 refers to the lamp voltage (Step S3). In the first launching period T1, the lamp voltage gradually increases with an increase in the drive power. Therefore, the lamp voltage that is referred to at the time ta is different from the lamp voltage in the stationary lighting period. Thus, the designer of the projector prepares, in advance, a conversion formula for finding the lamp voltage in the stationary lighting period from the lamp voltage value at the time ta, or a conversion table based on statistical values of voltage transition that is actually measured with plural discharge lamps. An example of the conversion table is shown in Table 2. Table 2 stows the relation with the refresh power shown in Table 1, in addition to the relation between the lamp voltage at the time ta and the lamp voltage in the stationary lighting period.

TABLE 2

| Lamp Voltage At Time ta | Lamp Voltage In Stationary Lighting Period | Refresh Power |
| --- | --- | --- |
| Up to 21 V | 0 to 60 V | 140 W |
| 22 t0 24 V | 61 to 70 V | 170 W |
| 25 to 28 V | 71 to 80 V | 180 W |
| 29 to 32 V | 81 to 90 V | 190 W |
| 33 V and above | 91 V and above | 200 W |

The control unit 40 estimates the lamp voltage in the stationary lighting period, based on Table 2 (Step S4), and determines the refresh power (Step S5). For example, if the lamp voltage that is referred to at the time ta is 30 V, the estimate value of the lamp voltage in the stationary lighting period is found as 81 to 90 V from Table 2. In this case, the value of optimum refresh power is 190 W, having the drive power waveform that is shown in FIG. 7.

As described above, in the discharge lamp lighting device 10 of this embodiment, the drive power waveform has, as the launching period of the discharge lamp 90, the first launching period T1 in which the drive power gradually increases toward the refresh power and the second launching period T2 in which the drive power is kept constant at the value of the refresh power. Moreover, the control unit 40 is configured to adjust the value of the refresh power according to the degree of deterioration of the discharge lamp 90. Therefore, regardless of the degree of deterioration of the discharge lamp 90, the protrusions at the distal ends of the electrodes can be constantly melted properly and the shape of the protrusions can be maintained. Consequently, since stable discharge is achieved, the light source 200 with less change in illuminance and a long service life can be realized. Thus, the projector 500 with excellent display definition and high reliability can be realized. Since the refresh power does not exceed the rated power of the discharge lamp 90, no excessive load is applied to the discharge lamp 90.

In this embodiment, the control unit 40 is configured to refer to the lamp voltage at an arbitrary time ta within the first launching period T1 and estimate the lamp voltage in the stationary lighting period on the basis of the result of the reference to the lamp voltage. According to this configuration, since the lamp voltage in the first launching period T1 is referred to every time the discharge lamp is lit, the lamp voltage in the stationary lighting period can be estimated accurately and the degree of deterioration of the discharge lamp 90 can be detected appropriately.

However, as the procedure from the reference to the lamp voltage to the determination on the refresh voltage, the following second procedure may be employed instead of the above first procedure. In the second procedure, the control unit 40 stores the lamp voltage that is referred to at the time of previous lighting of the discharge lamp, for example, in the storage unit 44 in advance. After that, at the time of next lighting of the discharge lamp, the control unit 40 reads out the lamp voltage from the storage unit 44 and estimates the lamp voltage in the stationary lighting period on the basis of the result of the reading.

In the case where the second procedure is employed, the inter-electrode voltage that is already stored at the time of previous lighting is referred, to at the time of next lighting. Therefore, the lamp voltage in the stationary lighting period can be easily estimated without referring to the lamp voltage within the launching period, and the degree of deterioration of the discharge lamp 90 can be detected appropriately.

Second Embodiment

A second embodiment is different from the first embodiment in the way the heat load applied to the discharge lamp 90 is changed with the deterioration thereof.

In the following description, the similar configurations to the first embodiment may be denoted by the same reference numerals as needed, thus omitting the description of these configurations.

In this embodiment, if the degree of deterioration of the discharge lamp 90 is equal to or below a predetermined value, the heat load applied to the discharge lamp 90 is set to be higher as the deterioration of the discharge lamp 90 progresses. If the degree of deterioration of the discharge lamp 90 is higher than the predetermined value, the heat load applied to the discharge lamp 90 is set to be equal to or below the heat load in the case where the degree of deterioration of the discharge lamp 90 is at the predetermined value.

In the following description, the case where the refresh power (second drive power) is adjusted as a method for adjusting the heat load and where the lamp voltage is referred to as a method for detecting the degree of deterioration will be described.

Figure 9:
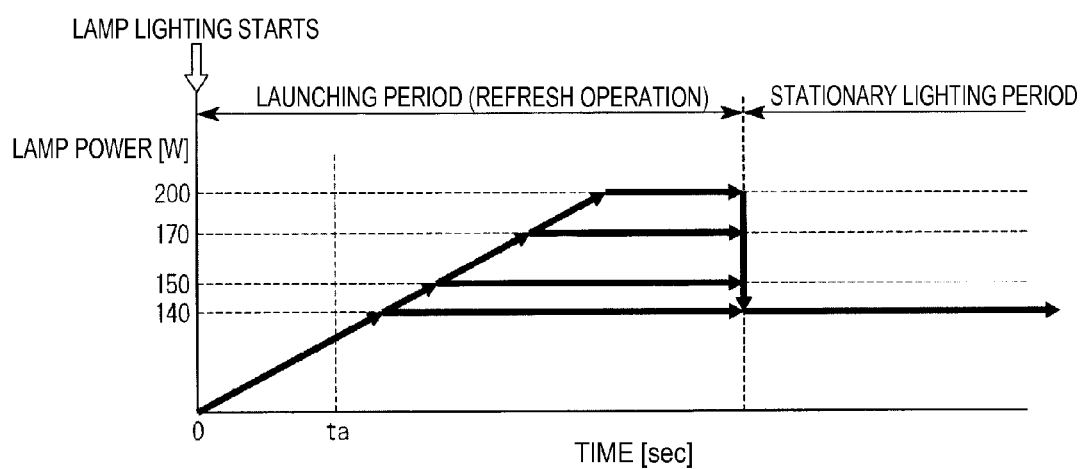
FIG. 9 shows an example of a drive power waveform of a discharge lamp according to a second embodiment.

FIG. 9 shows an example of the waveform of drive power in this embodiment. The horizontal axis in FIG. 9 represents time (seconds). The vertical axis in FIG. 9 represents drive power (W). In FIG. 9, plural drive power waveforms with different refresh powers are shown.

In the drive power waveforms in this embodiment, the launching period has a first launching period in which the drive power gradually increases toward the refresh power, and a second launching period in which the drive power is kept constant at the value of the refresh power, as shown in FIG. 9. The timing when the shift from the first launching period to the second launching period occurs is at the time when the drive power is increased to the refresh power. Therefore, in FIG. 9, the time when the second launching period is started differs by each drive power waveform.

The refresh power is set on the basis of the value of the lamp voltage. An example of the correlation between lamp voltage and refresh power in this embodiment is shown in Table 3.

TABLE 3

| Lamp Voltage That Is Referred To | Refresh Power |
|---|---|
| 0 to 60 V | 140 W |
| 61 to 70 V | 150 W |
| 71 to 80 V | 170 W |
| 81 to 90 V | 200 W |
| 91 to 100 V | 170 W |
| 100 to 110 V | 150 W |
| 111 V and above | 140 W |

In the example shown in Table 3, if the lamp voltage of the discharge lamp 90 is higher than a predetermined value, the refresh power is set to be lower as the lamp voltage of the discharge lamp 90 increases. In Table 3, the predetermined value of the lamp voltage indicating the degree of deterioration of the discharge lamp 90 is 90 V. That is, if the lamp voltage is equal to or below 90 V, the refresh power is set to be higher as the lamp voltage increases. If the lamp voltage is higher than 90 V, the refresh power is set to be lower as the lamp voltage increases.

Specifically, for example, in the range where the lamp voltage is equal to or above 0 V and equal to 90 V or below, the refresh power is set to foe higher stepwise from 140 W to 200 W. In the range where the lamp voltage is above 90 V, the refresh power is set to be lower stepwise from 200 W to 140 W. The predetermined value can be empirically found for each discharge lamp 90.

According to this embodiment, if the lamp voltage is above a predetermined value, that is, if the degree of deterioration of the discharge lamp 90 is higher than a predetermined value, the refresh power, that is, the heat load applied to the discharge lamp 90 is set to be equal to or below the heat load corresponding to the predetermined value. Therefore, a reduction in the service life of the discharge lamp 90 can be restrained. Detailed, description will be given hereinafter.

FIGS. 10A to 10C show change in the protrusion 552p at the distal end of the first electrode 92 as deterioration progresses. FIG. 10A shows the initial state where the discharge lamp 90 is not deteriorated. FIG. 10B shows the mid-term state where the discharge lamp 90 is deteriorated to a certain extent. FIG. 10C shows the terminal state where the discharge lamp 90 is deteriorated to a significant degree.

As shown in FIGS. 10A to 10C, as the deterioration of the discharge lamp 90 progresses, the shape of the first electrode 92 collapses and the protrusion 552p becomes narrower. If high refresh power is set in the terminal state where the protrusion 552p is narrower as shown in FIG. 10C, the protrusion 552p may melt and disappear. This may reduce the service life of the discharge lamp 90.

Meanwhile, according to this embodiment, if the lamp voltage is above a predetermined value, the value of refresh power is set to be equal to or below the value of refresh power when the lamp voltage is at the predetermined value. Therefore, application of an excessive heat load to the discharge lamp 90 in which the protrusion 552p of the first electrode 92 is narrowed by deterioration can foe restrained, and disappearance of the protrusion 552p can be restrained. Therefore, according to this embodiment, a reduction in the service life of the discharge lamp 90 can be restrained.

According to the embodiment, if the lamp voltage is above a predetermined value, the value of refresh power is set to be lower as the lamp voltage increases. Therefore, the heat load applied to the discharge lamp 90 can foe reduced as the protrusion 552p of the first electrode 92 becomes narrower due to deterioration. Thus, disappearance of the protrusion 552p can be restrained further and hence a reduction in the service life of the discharge lamp 90 can be restrained further.

In the embodiment, the following configuration may also be employed.

In the above description, the refresh power is set to be lower as the lamp voltage increases if the lamp voltage is above a predetermined value. However, this configuration is not limiting. In the embodiment, the refresh power may be changed, for example, as shown in Table 4.

TABLE 4

| Lamp Voltage That Is Referred To | Refresh Power |
|---|---|
| 0 to 60 V | 140 W |
| 61 to 70 V | 150 W |
| 71 to 80 V | 170 W |
| 81 to 90 V | 200 W |
| 91 to 100 V | 200 W |
| 100 to 110 V | 200 W |
| 111 V and above | 200 W |

In Table 4, if the lamp voltage is above a predetermined value, the refresh power in the case where the lamp voltage is at the predetermine value is maintained as it is. In the example shown in Table 4, if the lamp voltage is above 90 V, the refresh power is maintained at 200 W.

According to this configuration, since there is no need to change the refresh power when the lamp voltage is above the predetermined value, control is easy.

Also, according to this embodiment, the waveform of the drive current may be adjusted as a method for adjusting the heat load applied to the discharge lamp 90. Specifically, for example, the proportion of high-load driving in which a high load is applied to the discharge lamp 90, in the waveform of the drive current, is adjusted, thus adjusting the heat load applied to the discharge lamp 90. That is, the proportion of the high-load driving included in the drive current waveform is increased, thus increasing the heat load applied to the discharge lamp 90, and the proportion of the high-load driving included in the drive current waveform is reduced, thus reducing the heat load applied to the discharge lamp 90.

FIG. 11 shows an example of the waveform of high-load driving.

According to this configuration, a unit pattern made up of DC driving with one polarity for 8 milliseconds followed by 5 cycles of AC waveform with a frequency of 500 Hz is repeated for 10 cycles, and then the polarity of DC driving is inverted and a pattern repeating the similar driving is employed, as shown in FIG. 11. In this example, DC driving with the same polarity is inserted repeatedly for 10 cycles, thereby promoting the melting of the protrusion on one electrode. Although the DC driving time is not particular limited, it is preferable that the DC driving time is longer than the AC driving time between rounds of DC driving, in order to enhance the protrusion melting effect, that is, in order to increase the heat load applied to the discharge lamp 90. Also, in order to melt the protrusions on the two electrodes equally, it is preferable that the DC driving time with one polarity and the DC driving time with the other polarity are equal, when the insertion period of the waveform pattern of high-load driving is viewed as a whole.

The heat load applied to the discharge lamp 90 by the high-load driving can be increased by lowering the frequency of the AC waveform in the high-load driving. The heat load applied to the discharge lamp 90 by the high-load driving can be reduced by raising the frequency of the AC waveform in the high-load driving.

Examples of the correlation between lamp voltage and proportion of high-load driving in the drive current waveform are shown in Tables 5 and 6.

TABLE 5

| Lamp Voltage That Is Referred To | Proportion of High-Load Driving |
| --- | --- |
| 0 to 60 V | 50% |
| 61 to 70 V | 60% |
| 71 to 80 V | 70% |
| 81 to 90 V | 80% |
| 91 to 100 V | 70% |
| 100 to 110 V | 60% |
| 111 V and above | 50% |

TABLE 6

| Lamp Voltage That Is Referred To | Proportion of High-Load Driving |
| --- | --- |
| 0 to 60 V | 50% |
| 61 to 70 V | 60% |
| 71 to 80 V | 70% |
| 81 to 90 V | 80% |
| 91 to 100 V | 80% |
| 100 to 110 V | 80% |
| 111 V and above | 80% |

Table 5 shows an example where, if the lamp voltage is above a predetermined value, the proportion of high-load driving is set to be lower as the lamp voltage increases.

Table 6 shows an example where, if the lamp voltage is above a predetermined value, the proportion of high-load driving is maintained at the value in the case where the lamp voltage is at the predetermined value.

In both of the examples shown in Tables 5 and 6, the predetermined value of the lamp voltage is 90 V.

In the example shown in Table 5, if the lamp voltage is equal to or above 0 V and equal to or below 90 V, the proportion of high-load driving is set to increase stepwise from 50% to 80%. If the lamp voltage is above 90 V, the proportion of high-load driving is set to decrease stepwise from 80% to 50%.

In the example shown in Table 6, if the lamp voltage is equal to or above 0 V and equal to or below 90 V, the proportion of high-load driving is set to increase stepwise from 50% to 80%. If the lamp voltage is above 90 V, the proportion of high-load driving is set to be maintained at 80%.

In this configuration, the method for adjusting the heat load applied to the discharge lamp 90 is not limited to changing the proportion of high-load driving in the drive current waveform. For example, the AC driving time and the DC Driving time in the high-load driving may foe changed, or the frequency in the AC driving may be changed.

As a matter of course, also in the first embodiment, the above method of adjusting the drive current waveform may be used as a method for adjusting the heat load applied to the discharge lamp 90.

In this embodiment, each of the refresh power and the proportion of high-load driving in the drive current waveform may be changed as a method for adjusting the heat load applied to the discharge lamp 90. In this case, for example, if the lamp voltage is above a predetermined value, the refresh power may be maintained at a constant value while the proportion of high-load driving may he set to be lower as the lamp voltage increases.

Also, in this embodiment, for example, if the lamp voltage is equal to or below a predetermined value, the heat load applied to the discharge lamp 90 may foe kept constant, whereas if the lamp voltage is above the predetermined value, the heat load applied to the discharge lamp 90 may be set to be lower as the lamp voltage increases.

The technical scope of the invention is not limited to the above embodiments. Various changes can be made without departing from the spirit and scope of the invention.

For example, in the embodiments, the degree of deterioration of the discharge lamp is detected by referring to the lamp voltage. However, instead of this configuration, the degree of deterioration of the discharge lamp may be detected, for example, by referring to the cumulative lighting duration of the discharge lamp without referring to the lamp voltage. In this case, a table or the like showing the relation between the cumulative lighting duration of the discharge lamp and the refresh power may be prepared.

In the embodiments, an example where the invention is applied to a transmission-type projector is described. However, the invention can also be applied to a reflection-type projector. Here, the term "transmission-type" means a type in which the liquid light valves including liquid crystal panels transmit light. The term "reflection-type" means a type in which the liquid light valves reflect light. The light modulation device is not limited to liquid crystal panels or the like. For example, a light modulation device using a micro mirror may also be employed.

In the embodiment, only the example of the projector 500 using the three liquid crystal panels (liquid crystal light valves 330R, 330G, 330B) is described. However, the invention can also be applied to a projector using a single liquid crystal panel, or a projector using four or more liquid crystal panels.

Moreover, the specific configurations of the discharge lamp driving device, the light source and the projector are not limited to the examples in the embodiments, and changes can be made as needed.

The entire disclosure of Japanese Patent Application No.: 2013-213472, filed Oct. 11, 2013 and 2014-068225, filed Mar. 28, 2014 are expressly incorporated by reference herein.

What is claimed is:
1. A discharge lamp driving device comprising:
a discharge lamp driving unit which supplies drive power to a discharge lamp; and
a control unit which controls the discharge lamp driving unit;
wherein the control unit is configured to execute a first driving in which first drive power is supplied to the discharge lamp and a second driving in which second drive power that is equal to or higher than the first drive power and equal to or lower than rated power of the discharge lamp is supplied to the discharge lamp, the control unit executes the second driving in a launching period of the discharge lamp, and the control unit adjusts a heat load applied to the discharge lamp in the second driving executed in the launching period, according to a degree of deterioration of the discharge lamp.

2. The discharge lamp driving device according to claim 1, wherein the control unit sets the heat load to he higher with progress of the deterioration of the discharge lamp.

3. A projector comprising:
a discharge lamp which emits light;
the discharge lamp driving device according to claim 2;
a light modulation element which modulates light emitted from the discharge lamp, according to a video signal; and
a projection system which projects the light modulated by the light modulation element.

4. The discharge lamp driving device according to claim 1, wherein in case that the degree of deterioration of the discharge lamp is higher than a predetermined value, the control unit sets the heat load to be equal to or lower than the heat load corresponding to the predetermined value.

5. The discharge lamp driving device according to claim 4, wherein in case that the degree of deterioration of the discharge lamp is equal to or lower than the predetermined value, the control unit sets the heat load to be higher with progress of the deterioration of the discharge lamp.

6. The discharge lamp driving device according to claim 5, wherein in case that the degree of deterioration of the discharge lamp is higher than the predetermined value, the control unit sets the heat load to be lower with progress of the deterioration of the discharge lamp.

7. A projector comprising:
a discharge lamp which emits light;
the discharge lamp driving device according to claim 6;
a light modulation element which modulates light emitted from the discharge lamp, according to a video signal; and
a projection system which projects the light modulated by the light modulation element.

8. A projector comprising:
a discharge lamp which emits light;
the discharge lamp driving device according to claim 4;
a light modulation element which modulates light emitted from the discharge lamp, according to a video signal; and
a projection system which projects the light modulated by the light modulation element.

9. A projector comprising:
a discharge lamp which emits light;
the discharge lamp driving device according to claim 4;
a light modulation element which modulates light emitted from the discharge lamp, according to a video signal; and
a projection system which projects the light modulated by the light modulation element.

10. The discharge lamp driving device according to claim 1, wherein the adjusting of the heat load includes adjusting a value of the second drive power.

11. A projector comprising:
a discharge lamp which emits light;
the discharge lamp driving device according to claim 10;
a light modulation element which modulates light emitted from the discharge lamp, according to a video signal; and
a projection system which projects the light modulated by the light modulation element.

12. The discharge lamp driving device according to claim 1, wherein the adjusting of the heat load includes adjusting a waveform of a drive current supplied to the discharge lamp in the launching period.

13. A projector comprising:
a discharge lamp which emits light;
the discharge lamp driving device according to claim 12;
a light modulation element which modulates light emitted from the discharge lamp, according to a video signal; and
a projection system which projects the light modulated by the light modulation element.

14. The discharge lamp driving device according to claim 1, wherein the control unit detects the degree of deterioration of the discharge lamp by referring to an inter-electrode voltage of the discharge lamp in the first driving.

15. The discharge lamp driving device according to claim 14, wherein the launching period includes a first launching period in which the drive power is increased toward the second drive power, and the control unit refers to the inter-electrode voltage at an arbitrary time point in the first launching period and estimates the inter-electrode voltage in the first driving on the basis of a result of the reference to the inter-electrode voltage.

16. The discharge lamp driving device according to claim 14, wherein the control unit reads out the inter-electrode voltage stored at the time of previous lighting of the discharge lamp, at the time of next lighting of the discharge lamp, and estimates the inter-electrode voltage in the first driving on the basis of a result of the reading of the inter-electrode voltage.

17. A projector comprising:
a discharge lamp which emits light;
the discharge lamp driving device according to claim 14;
a light modulation element which modulates light emitted from the discharge lamp, according to a video signal; and
a projection system which projects the light modulated by the light modulation element.

18. A projector comprising:
a discharge lamp which emits light;
the discharge lamp driving device according to claim 1;
a light modulation element which modulates light emitted from the discharge lamp, according to a video signal; and
a projection system which projects the light modulated by the light modulation element.

19. A discharge lamp driving method in which drive power is supplied to a discharge lamp to drive the discharge lamp, the method comprising:
providing a first driving in which first drive power is supplied to the discharge lamp;
providing a second driving in which second drive power is supplied to the discharge lamp, the second drive power being equal to or higher than the first drive power and equal to or lower than rated power of the discharge lamp;
executing the second driving in a launching period of the discharge lamp; and
adjusting a heat load applied to the discharge lamp in the second driving executed in the launching period according to a degree of deterioration of the discharge lamp.

* * * * *